Dec. 6, 1966 A. S. RETTIG ET AL 3,290,654

INFORMATION HANDLING SYSTEM

Filed March 8, 1961 6 Sheets-Sheet 1

Inventors:
ORVAL A. GWINN,
ALBERT S. RETTIG &
DAVID Z. COHEN
BY John V. Regan
ATTORNEY

INFORMATION HANDLING SYSTEM

Filed March 8, 1961 6 Sheets-Sheet 2

Inventors:
ORVAL A. GWINN,
ALBERT S. RETTIG &
BY DAVID Z. COHEN
John V. Regan
ATTORNEY Inventors:
ORVAL A. GWINN,
ALBERT S. RETTIG &
BY DAVID Z. COHEN
John V. Regan
ATTORNEY Inventors:
ORVAL A. GWINN,
ALBERT S. RETTIG &
BY DAVID Z. COHEN
John V. Regan
ATTORNEY Inventors:
ORVAL A. GWINN,
ALBERT S. RETTIG &
BY DAVID Z. COHEN
John V. Regan
ATTORNEY

INFORMATION HANDLING SYSTEM

Filed March 8, 1961 6 Sheets-Sheet 6

Inventors:
ORVAL A. GWINN,
ALBERT S. RETTIG &
BY DAVID Z. COHEN
John V. Regan
ATTORNEY 3,290,654

INFORMATION HANDLING SYSTEM

Albert S. Rettig, Haddonfield, N.J., David Z. Cohen, Tel Aviv, Israel, and Orval A. Gwinn, Pennasuken, N.J., assignors to Radio Corporation of America, a corporation of Delaware

Filed Mar. 8, 1961, Ser. No. 94,253

7 Claims. (Cl. 340—172.5)

This invention relates to information handling systems and, more particularly, to apparatus for connecting accessory equipment on-line to a computer, and for controlling the operation of said equipment, without requiring a physical change in the computer or a change in the construction complement thereof.

A computer system can be designed so that numerous different types of equipment such as printers, perforators, tape stations and the like may be connected on-line to the central equipment, which may be a computer. That is, the various equipments transfer and receive information signals to and from the computer. Such design generally requires the provision of trunk lines or other means for the physical connection of each of these equipments to the computer. Moreover, special operation codes must be included in the instruction complement of the computer to permit communication with, and control by, the computer of each of the equipments. Furthermore, storage space often must be allotted for these instructions and the necessary hardware must be provided in the computer for directing the logical operations dictated by the instructions. These design features, of course, add to the cost of the basic computer system and often are minimized to enhance the marketability of the computer system.

A basic system, for example, may have one or more trunks for connecting on-line, and operation codes for directing control of the operation of, one or more magnetic tape stations. The purchaser, however, may desire to operate on-line other equipment, such as a drum storage file, for which no provisions for on-line operation are made in the basic system. Furthermore, more control signals or levels may be required to control the operation of the drum storage file equipment than there are tape command signals available.

It is an object of this invention to provide apparatus for operating accessory equipment on-line in a computer system.

It is another object of this invention to provide apparatus for connecting on-line to a computer, and for controlling the operation of, equipment with which the computer is not separately designed for on-line communication.

It is still another object of this invention to provide apparatus which receives, from a computer, signals representing operation codes or corresponding command signals designed to control the operation of a first type of equipment, and which modifies these signals to control a second, different type of equipment, at the same time simulating the first equipment.

Yet another object of the invention is to provide apparatus which: connects into an existing computer trunk provided for a first on-line equipment, receives signals from the computer designed to control the operation of the first equipment, and modifies said signals and generates additional signals for controlling the selection and transfer of data to and from the computer and a second, different equipment.

Still another object of the invention is to provide apparatus of the type described which does not require any physical change in the computer or any change in the instruction complement thereof.

In accordance with these and other objects of the invention, a "simulator and control unit" is connected to an existing computer trunk which is provided for connection to a first type of equipment. This unit receives command signals from the computer in accordance with existing operation codes provided for the control of the first type of equipment, and simulates the first equipment by sending back to the computer return signals of the type and sense ordinarily returned by the first equipment in response to the command signals. In addition, this unit generates and controls a series of logical events which are not in themselves operating functions of the first equipment. These logical events are used to control the operation of a second, different equipment connected equipment connected to the unit.

A feature of the present invention is the flexibility that it adds to a basic computer system.

Another feature of the invention is the savings in cost which it provides in a basic computer system.

A further feature of the invention is a hold circuit which prevents command signals, received from the computer, from affecting the operation of the control unit and user equipment until the operation set in motion by previous command signals has been carried out by the control unit and/or user equipment.

A further feature of the invention is the ability, by appropriate signal returns, for the device to inform the basic computer of an inability to make certain comparisons specified by a given operation, or otherwise perform normal operation.

In the accompanying drawing like reference numerals refer to like components, and:

Figure 1:
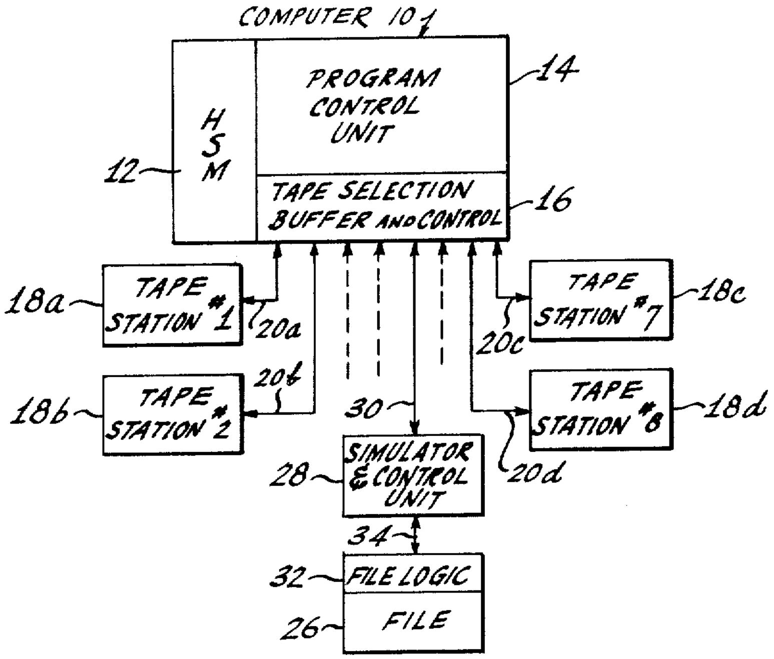
FIGURE 1 is a block diagram of a basic computer system illustrating a typical operating environment for the present invention.
Figures 4, 4B:
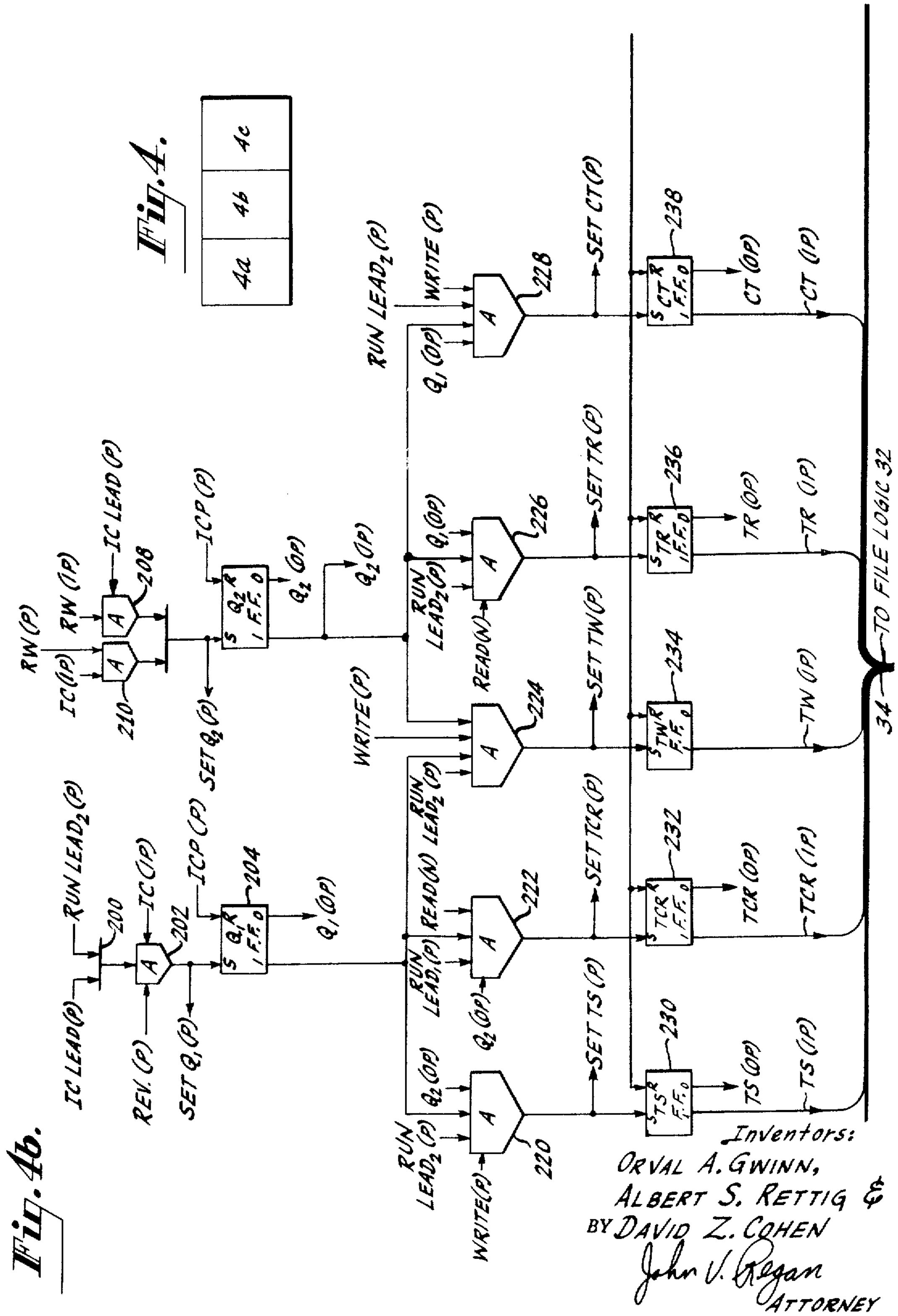
Figure 5:
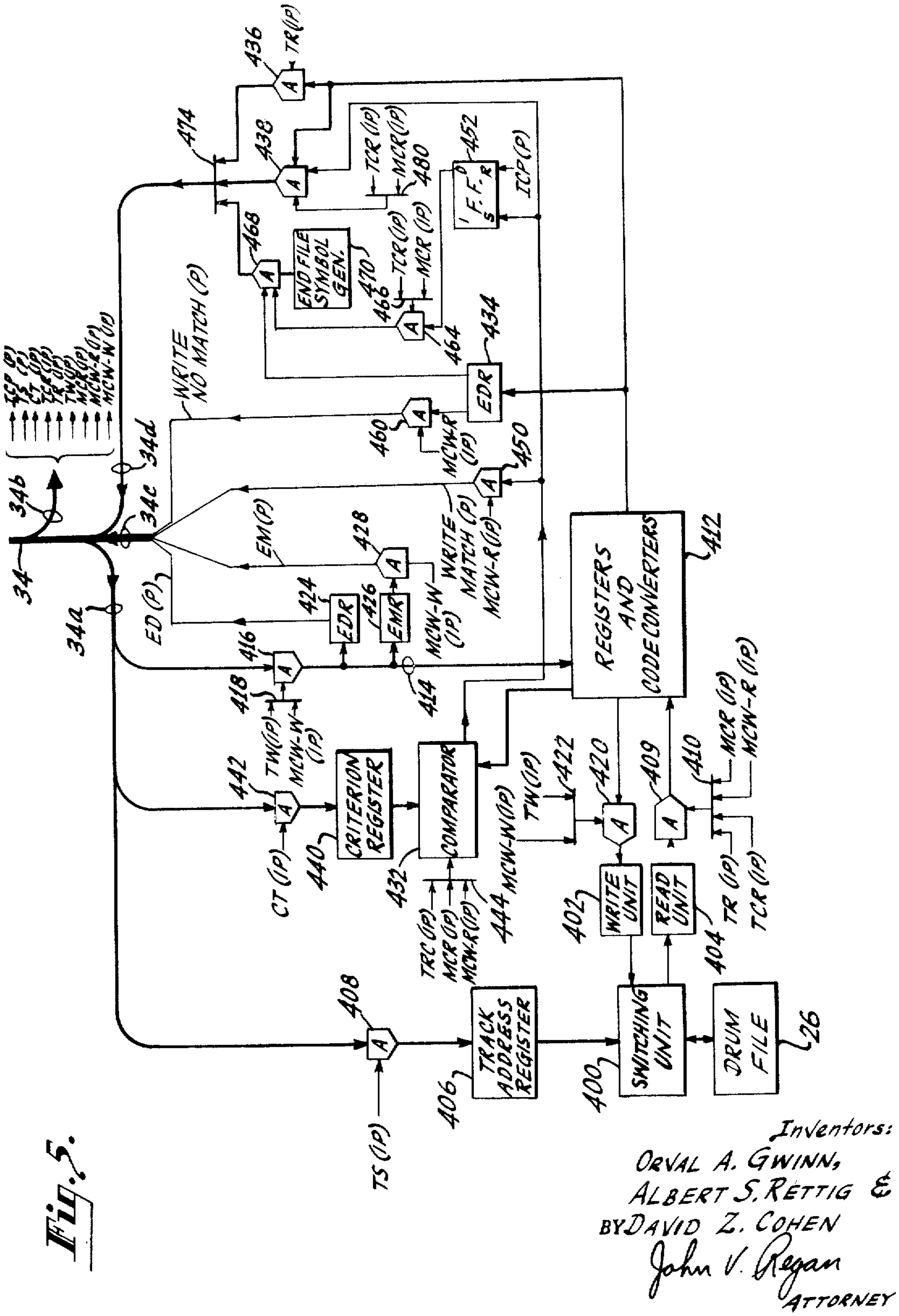

FIGURES 4(*a*), 4(*b*) and 4(*c*), when taken together, form FIGURE 4, and are block diagrams of different portions of the simulator and control unit of FIGURE 1; and FIGURE 5 is a block diagram of one example of suitable file logic for controlling the operation of a drum file in response to signals provided by the control unit of FIGURE 4.

GENERAL DESCRIPTION

As an example of the function of the present invention, and as an illustration of a typical operating environment therefor, consider the system illustrated in block form in FIGURE 1. A basic computer, which is not a part of the invention, is shown within the large block 10, and may comprise, as illustrated, a high speed memory 12, a program control unit 14, or control central, and a tape selection, buffer and control section 16. The high speed memory 12 may be, for example, a magnetic core memory well known in the art. The memory 12 may have stored in a portion thereof a stored program for controlling the operation of the system. The program control unit 14, as the term is generally understood in the art, is the arithmetic and logic control element for the computer system. The program control unit 14 interprets and executes the instructions of the program stored in the high speed memory 12 and executes input/output, data handling, arithmetic, and decision and control instructions.

The tape selection, buffer and control 16 provides means for physically connecting a plurality of magnetic tape stations to the computer 10. This unit 16 also contains the necessary circuitry for electrically connecting a selected tape station on-line to the computer 10.

A basic computer system may have provision for the on-line connection and operation of various other types of equipment (not shown). For purposes of illustrating the present invention, however, consider that the computer system has provision for the on-line connection and control only of tape stations, for of which 18*a* . . . 18*d* are illustrated in block form in the drawing. Each of these tape stations 18*a* . . . 18*d* is connected to the computer 10 by a different tape trunk 20*a* . . . 20*d*, respectively. The computer instruction complement includes the necessary tape operation codes (to be described) which are required to control the operation of the tape stations and the transmission of data between the computer and the tape stations. The tape operation codes may be converted to command signals in the computer 10 and supplied to the selected tape station on selected control lines within the associated trunk 20.

The purchaser of a computing system may desire to operate on-line a particular type of equipment, such as a file system 26 of magnetic drums, discs, cards, or the like for which no on-line provision is made in the basic system. The present invention provides means for operating such equipment on-line, although the computer system has no provision for connection to a file, per se, and no file operation codes in the instruction complement. In accordance with the invention, a simulator and control unit 28 is plugged into an existing tape trunk 30 (or other existing trunk provided for connection to a different type of equipment). The simulator and control unit 28 is logically arranged so that this unit presents the "appearance" of a tape station to the computer 10, while in effect exercising the necessary control over file 26 by generating, from tape commands, the necessary control signals for operating the file 26.

The file 26, as illustrated in FIGURE 1, has its own logic network 32 which receives the control signals supplied by the control unit 28. The control unit 28 is connected to the file logic 32 and file 26 by a multichannel cable 34. The trunk 30 contains the same number of lines as the other tape trunks 20. More specifically, the trunk 30 has the necessary lines for the transmission of information to and from the computer 10, control lines for transmitting the tape command signals to the simulator 28, and other lines over which the return signals aforementioned are sent from the simulator 28 to the computer 10. Multichannel cable 34 has lines for the transmission of information to and from the file 26 and file logic 32, and control lines for transmitting control signals between the simulator unit 28 and the file logic 32.

Since the simulator and control unit 28 can only receive and respond to tape command signals from the computer 10, and since it may be desired to generate more control signals or levels for control of the file than the number of tape command signals available, a combination of existing tape instruction codes can be used to generate the desired control levels. Insofar as the computer 10 itself is concerned, the instructions are exectued in the same manner as though a tape station were connected to the trunk 30.

Although the simulator and control unit 28 is illustrated in FIGURE 1 as controlling the operation of a storage file, it is to be understood that such showing is by way of illustration only, and that other types of equipment also could be controlled by the simulator and control unit 28. It is also to be undersood that the simulator and control unit 28 could be connected to a trunk provided for on-line operation of equipment other than a tape station. In the latter event, the simulator would be logically arranged to present the appearance of that other equipment to the computer 10, while receiving command signals generated in response to the operation codes for that equipment . For convenience however, the simulator and control unit 28 will be described hereinafter as controlling the operation of a drum storage file in response to tape operation codes.

A brief description of some of the more pertinent features of on-line tape station operation will now be given in order to provide a clearer understanding of certain aspects of the invention. Communication between a computer and an on-line tape station, and control of the latter, are governed in accordance with the computer's program. The program is a sequence of coded instructions, each of which includes an operation code as a part thereof. A computer instruction for controlling a tape station operation may be as follows:

(15) (A) (B) (T)

The number "15" indicates the operation or order code. "A" may designate a first location in the high speed memory or, alternatively, may designate a register which stores the memory address. "B" may designate a different location in the high speed memory or, alternately, a different register. "T" may designate a particular trunk number.

The operation code designates the operation to be performed, and different operation codes are used to control the various operating functions of a tape station. These codes are designated herein "tape operation codes." The operation codes may be interpreted in the program control unit 14 of the computer 10, and control signals or levels may be applied to selected control lines of a tape runk to control the tape station operation. For example, "15" may designate a tape write operation. Command signals generated in response to this operation code cause the tape in a selected station to run in a forward direction and also energize the write amplifiers in that station. The selected station is designated "T" in the instruction. "A" may be the memory address of the first character to be written on the tape, and "B" may be the memory address of the last character to be written on the tape during the operation, the intervening characters to be written on the tape in the sequence of their respective memory addresses.

Figure 2:
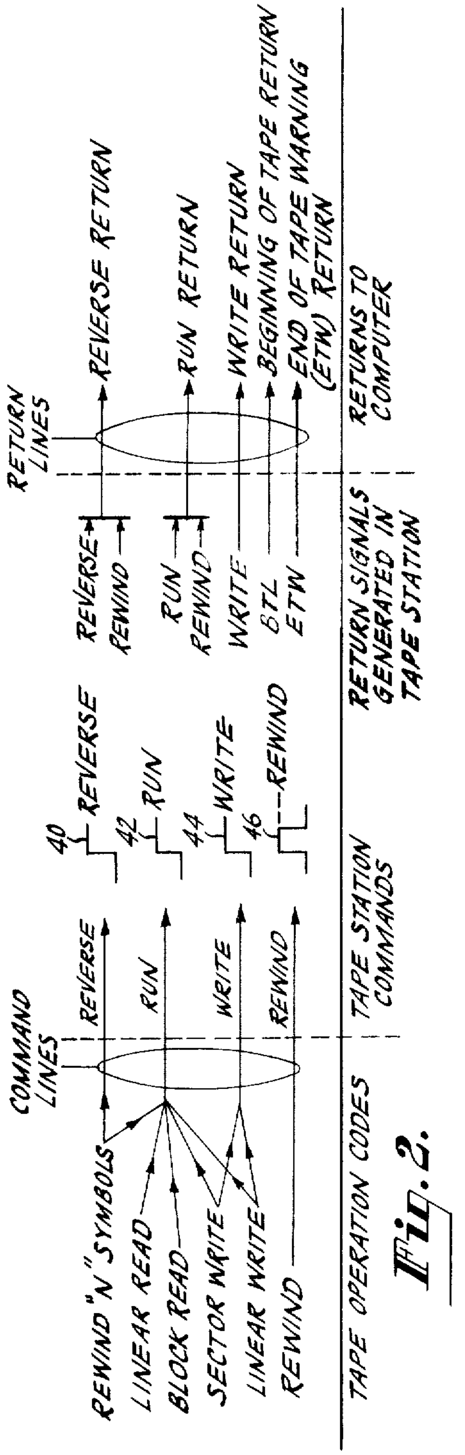
FIGURE 2 is a list of tape station operation codes used in one known computer system, waveforms of command signals supplied to a tape station in response to these codes, and a list of signal responses returned to the computer by the tape station acknowledging receipt of the command signals and identifying the status of the tape station.

In the left-hand portion of FIGURE 2 are listed the tape operation codes employed in a known computer system. In the computer, of course, these operations appear in digitally coded form. Control signals or levels are applied to a tape station by way of control lines in response to these operation codes. The control signals, also called "command signals" may be pulses or levels. The REWIND "N" SYMBOLS operaton code causes high voltage levels 40, 42 to appear on control lines designated "REVERSE" and "RUN," respectively. The LINEAR READ and BLOCK READ operation codes cause a high voltage level 42 to appear on the control line designated "RUN." The SECTOR WRITE and LINEAR WRITE operation codes cause high voltage levels 42 and 44 to appear on the control lines "RUN" and "WRITE." The REWIND operation code causes a positive going pulse 46 to appear on the control line designated REWIND.

The aforementioned control lines are a part of the tape trunk, and the command signals, therefore, are supplied to the selected tape station. The tape station acknowledges receipt of a command signal by sending a reply signal or signals to the computer. A list of the tape station return signals appears at the right of FIGURE 2. The computer exercises complete control over the tape station when the tape station is in a "read" or "write" mode, that is to say, in response to any of the LINEAR READ, BLOCK READ, SECTOR WRITE and LINEAR WRITE operation codes. During a "write" operation, when information is transferred to the tape staton, high voltage command levels 42 and 44 are applied to the control lines "RUN" and "WRITE." The computer terminates the instruction after all of the information designated by the instruction is transferred to the tape station. The high voltage command levels 42 and 44 terminate with the termination of the instruction. During a "read" operation, the computer terminates the instruction after the desired information is received from the tape station, after which the high voltage command level 42 is terminated.

The REWIND "N" SYMBOLS and REWIND operation codes deserve special mention. Rewind pulse 46 controls certain logical operations in the tape station to cause the tape to back up to the beginning of the tape. The beginning of the tape may be recognized, for example, by a special symbol, by a metallic strip spliced to the tape, or by other known means. When the rewind pulse 46 is sent from the computer during the REWIND operation, the tape station sends "REVERSE RETURN" and "RUN RETURN" signals to the computer acknowledging receipt of the command pulse. The tape station then runs free of computer control until the beginning of the tape is sensed, at which time a "BEGINNING OF TAPE" signal (BTL) is sent to the computer to inform the computer that the operation is completed. The instruction then is terminated by the computer. The REWIND "N" SYMBOL operation code causes the tape to back up "N" symbols or characters, where "N" may have any designation. The instruction is terminated either at the completion of the operation (the count "N" has been reached) or when the tape has backed up to the beginning, whichever occurs first. In the former case, the computer terminates the instruction after the tape has backed up the proper amount. In the latter case, the tape station sends a "BTL RETURN" to the computer to terminate the tape instruction.

The tape station sends an "END OF TAPE WARNING" (ETW) signal to the computer whenever the tape reaches a certain point in its forward travel, usually near the end of the tape. This ETW signal causes the instruction in the computer to terminate.

The simulator and control unit 28 of FIGURE 1 can receive only the command signals described above from the computer 10, since the control unit 28 is connected to a tape trunk 30. All control signals required by the file 26 and file logic 32 must be derived from these command signals since no other command signals are available from the computer. In addition, the simulator and control unit 28, in order to simulate a tape station, must return the same signals for any instruction as would be returned if a tape station were connected to the trunk 30. These requirement are met by the present invention, as will be described more fully hereinafter.

Figure 3:
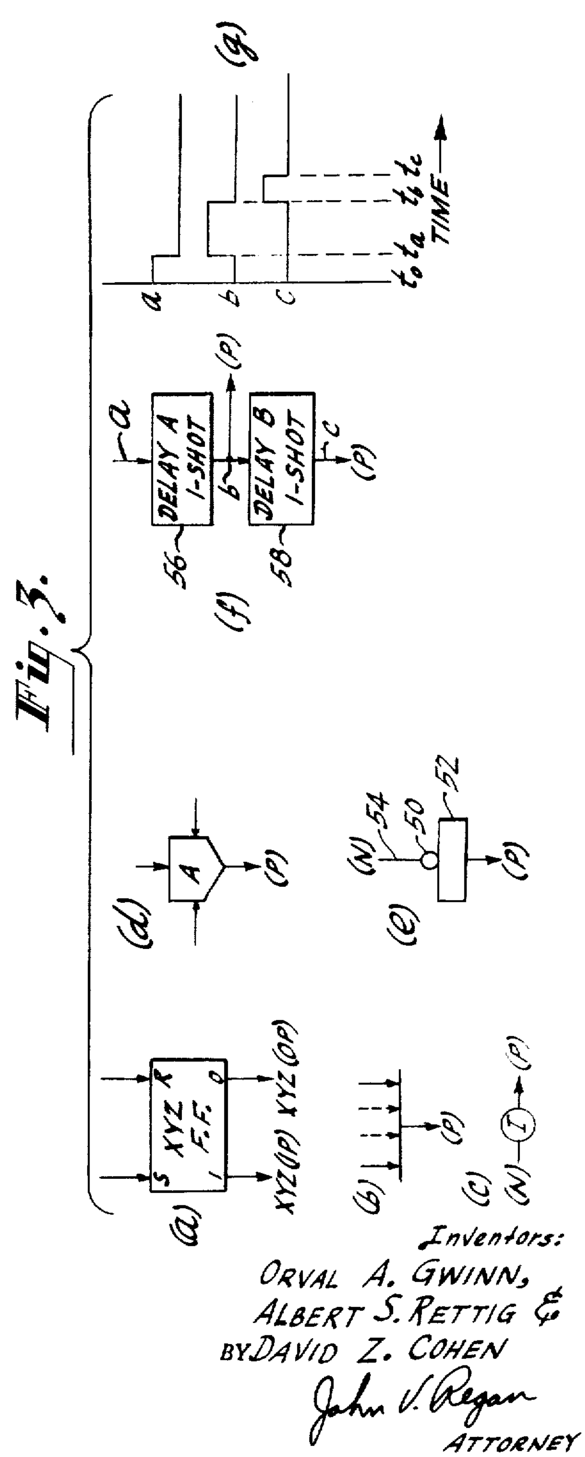
FIGURE 3 is a set of symbols used to represent certain circuits in various ones of the other figures of the drawing.

FIGURE 3 illustrates in block form the symbols which are used in the block diagrams of FIGURES 4 and 5. FIGURE 3(*a*) illustrates the symbol for a flip-flop. A flip-flop may be defined as a circuit having two stable states, two input lines, and two output lines. One output line is high, relatively speaking, at the same time that the other output is low, again relatively speaking. The flip-flop, which may be of the Eccles-Jordan type, has set (S) and reset (R) input terminals and one (1) and zero (0) output terminals. Positive-going input signals are required to change the state of the flip-flop. A positive signal applied at the set (S) input terminal switches the flip-flop to a first stable state in which a high voltage is present at the (1) output terminal, and a low voltage is present at the (0) output terminal. The flip-flop remains in this state until a positive signal is applied at the reset (R) input terminal. The latter signal causes the flip-flop to switch to the other stable state, in which the (1) and (0) output voltages are then low and high, respectively. The output at the (1) output terminal is designated by the name of the flip-flop, followed by (1P). The designation (1P) indicates that the (1) output is high (or more positive) when the flip-flop is set. The output at the (0) terminal is designated by the name of the flip-flop followed by (0P). The designation (0P) indicates that the (0) output is high (or more positive) when the flip-flop is in the reset state.

FIGURE 3(*b*) illustrates the symbol used in the drawing to represent an "or" gate. An "or" gate may be defined as a circuit which has two or more input lines and one output line, and which has the property that whenever a signal of prescribed polarity is present on any of the input lines, a signal of that polarity is present on the output lines. The "or" gate of FIGURE 3(*b*) (and the other figures) has a low output voltage whenever all of the inputs thereto are low, and has a high output whenever one or more of the inputs is high. The output is designated (P) to indicate the relative polarity of the output in response to an input signal of the prescribed polarity. A suitable "or" gate for use in practicing the invention is of the general type illustrated and described in section 198 of the publication Basic Theory and Application of Transistors, Technical Manual 11–690, published by the Department of the Army.

FIGURE 3(*c*) illustrates the symbol for an inverter circuit. An inverter circuit, for purposes of the invention, may be defined as a circuit having one input and one output, and which has the property that the output is high, relatively speaking, when the input is low, and vice versa. The invertor circuit may be a "nor" gate having all inputs floating except the one to which input signals are applied. The output is labeled (P) to indicate that the output is high when the input, labelled (N), is low.

FIGURE 3(*d*) illustrates the symbol for a multi-input "and" gate. An "and" gate may be defined as a pulse circuit having two or more input lines and one output line which has the property that an output pulse of prescribed polarity is present if, and only if, input signals of prescribed polarity are applied to all of the input lines concurrently. The "and" gate illustrated in FIGURE 3(*d*) has a high output only when all of the inputs thereto are high, and has a low output at all other times. The output is labelled (P) to indicate the relative polarity of the output when all inputs are of the prescribed polarity. A suitable "and" gate for use in the invention is illustrated and described in section 199 of the publication aforemention.

FIGURE 3(*e*) represents the symbol employed in the drawings for an inverted input. The small circle 50 indicates that a high input is applied to the unit 52 in response to a low input on the input line 54. Alternatively, a low input is applied to the unit 52 when a high input is present on the input line 54.

FIGURE 3(*f*) illustrates the symbol used in the drawings for circuitry which provides delayed pulse signals. FIGURE 3(*g*) is a set of waveforms illustrating the inputs and outputs of the delay circuitry. The circuitry providing the delayed signals may comprise two cascaded one-short multivibrators. The delay "A" one-shot multivibrator 56 provides a positive output pulse (*b*) of adjustable width in response to a negative-going input signal or level (*a*). The delay "B" one-shot 58 provides a positive output pulse (*c*) in response to a negative-going input signal (*b*). Operation of the delay circuits may best be understood from a consideration of the waveforms of FIGURE 3(*g*). At time $T_a$, the input (*a*) to the delay "A" one-shot 56 drops to a low level. This drop in voltage triggers the delay "A" one-shot 56, and a positive-going pulse (*b*) appears at the input. The trailing edge of this pulse (*b*) at $T_b$ is negative-going, and triggers the delay "B" one-shot 58. A positive pulse (*c*) appears at the output of the delay "B" one-shot 58. It is to be noted that the leading edge of the pulse (*b*) leads the leading edge of the pulse (*c*).

SIMULATOR AND CONTROL UNIT 28

Figure 4A:
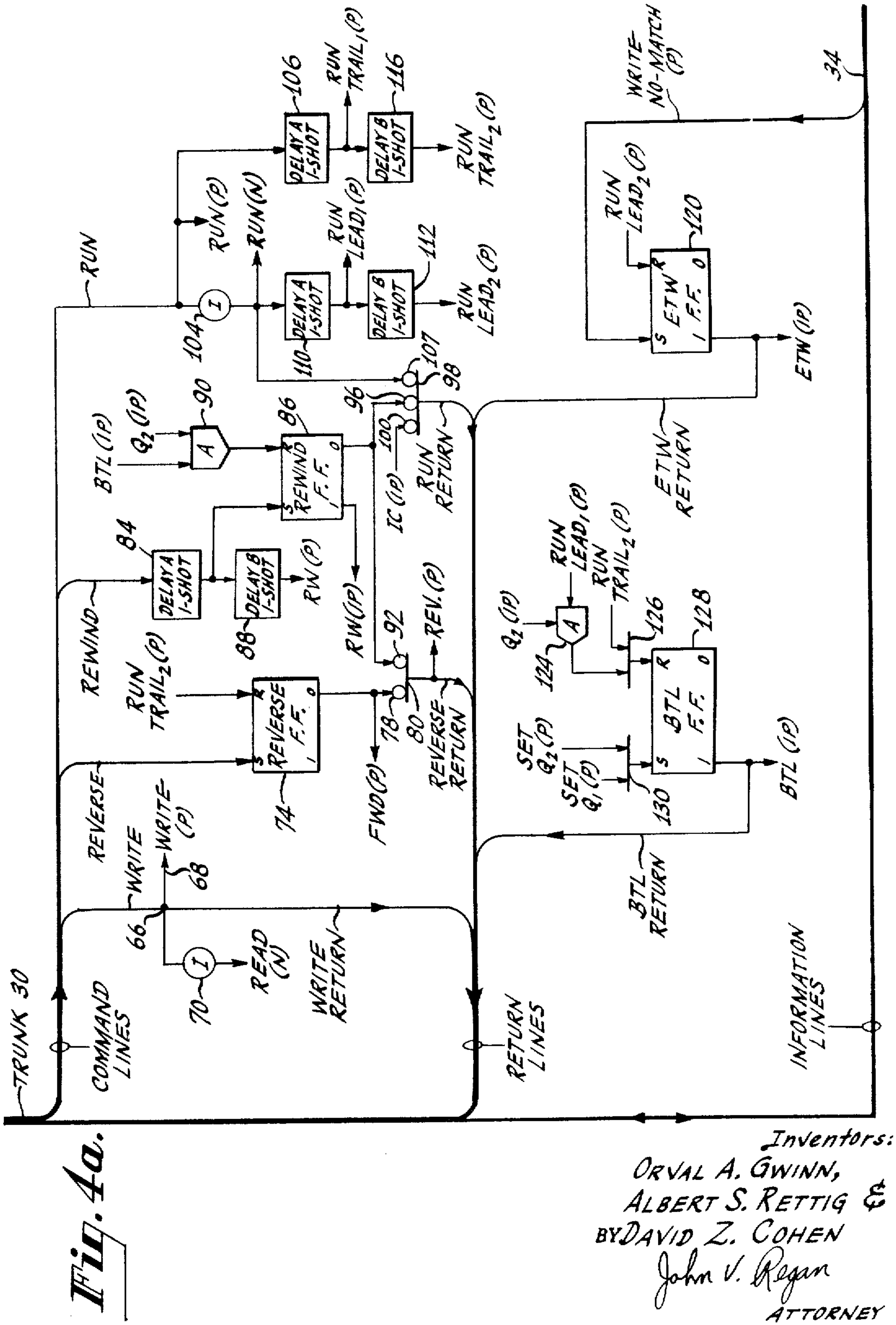
Figure 4C:
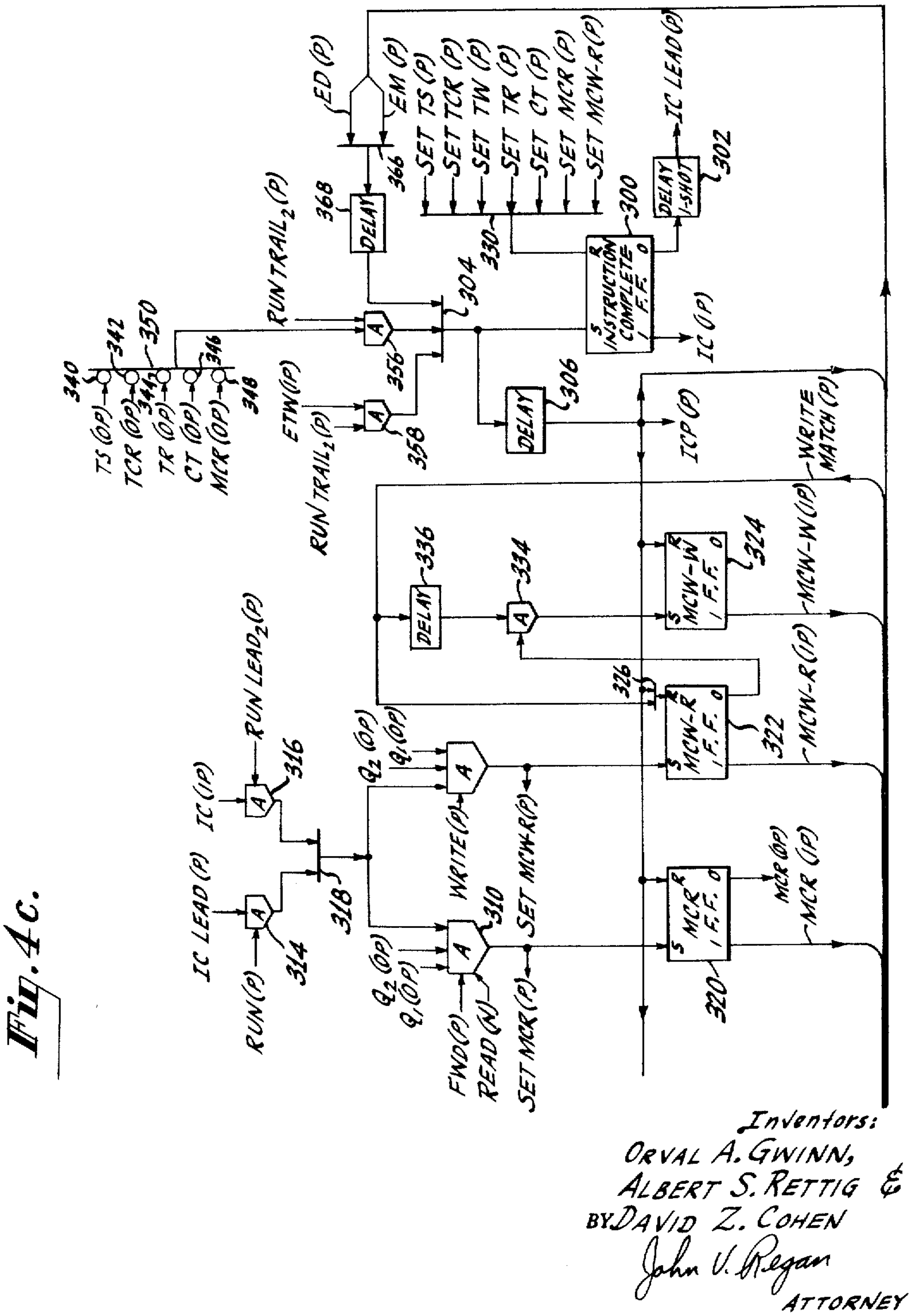

FIGURE 4(*a*) is a block diagram of the simulator portion of the simulator and control unit 28 of FIGURE 1. All information and control lines to and from the unit 28 and the computer 10 are located in the tape trunk 30. In FIGURE 4*a*, input lines carrying command signals from the computer 10, and lines carrying return signals to the computer 10 are designated by the same names given the corresponding lines in FIGURE 2.

"Write" command signals are applied over the WRITE input line to a junction point 66. Connected to this junction 66 are: (1) the WRITE RETURN line, (2) a signal line 68, and (3) an inverter circuit 70. The inverter 70 output is designated READ (N), and the signal on the line 68 is designated WRITE (P). These latter signals are supplied to user circuits in FIGURES 4(*b*) and 4(*c*). Direct line connections to the user circuits are omitted in order to avoid unduly complicating the drawing. It will be understood, however, that a circuit having an input READ (N), for example, receives that input from the inverter circuit 70. It will also be understood that in practice, the inverter 70, the WRITE RETURN line, and the signal line 68 may be decoupled from one another by amplifiers or other means which are not shown in the drawing, again to avoid undue complication. When the WRITE input line carries a high voltage command signal, indicating a write operation, the output of the inverter 70 is low, the WRITE (P) signal is high, and the return signal supplied to the computer 10 by way of the WRITE RETURN line and the trunk 30 also is high. These signals have the opposite level when the WRITE input line carries a low voltage signal or level, indicating absence of a "write" command. It will be recognized from the above description and a consideration of FIGURE 2 that the simulator's signal reply to the computer in response to a "write" command signal is the same as that which would be provided by a tape station.

"Reverse" command signals from the computer 10 are applied over the REVERSE input line to the (S) input terminal of a REVERSE flip-flop 74. A signal designated RUN $TRAIL_2$ (P), from a source to be described, is applied to the (R) input terminal of the flip-flop 74. The (0) output of the flip-flop is supplied as a control signal FWD (P) to circuitry in FIGURE 4(*c*) and also is applied to the input of an inverter 78, the output of which is applied to one input of a two-input "or" gate 80. The "or" gate 80 output is supplied to other circuits as a control signal, REV (P), and also is sent to the computer 10 over the REVERSE RETURN line.

The "rewind" command pulse from the computer is applied over the REWIND input line as a trigger input pulse to a DELAY "A" ONE-SHOT 84. The output of this one-shot 84 is connected to the (S) terminal of a REWIND FLIP-FLOP 86 and to the input terminal of a DELAY "B" ONE-SHOT 88. The output of the latter one-shot 88 is a control signal, RW (P). The (1) output of the REWIND FLIP-FLOP 86 is a control level designated RW (1P), which level is high when the flip-flop is in the set state. Control signals BTL (1P) and $Q_2$ (1P), to be described, are applied to first and second inputs of a two-input "and" gate 90, the output of which is applied to the (R) input terminal of the REWIND FLIP-FLOP 86.

The (0) output of the REWIND FLIP-FLOP 86 is connected to the input of an inverter 92, the inverted output of which is supplied to a second input of the REVERSE RETURN "or" gate 80, described previously. The output of the "or" gate 80 is high and a REVERSE RETURN signal is sent to the computer whenever either the REVERSE FLIP-FLOP 74 or the REWIND FLIP-FLOP 86 is set. This condition obtains in response to either a "reverse" command signal or a "rewind" command pulse. It may be seen from FIGURE 2 that the REVERSE RETURN to the computer is the same as would be provided by a tape station connected to the trunk 30.

The output at the (0) output terminal of the REWIND FLIP-FLOP 86 also is inverted by an inverter 96, and the inverted signal applied to one input of a three-input "or" gate 98. A second input to this "or" gate 98 is the output of an inverter 100, which receives a control signal IC (1P) at the input thereof. The source of this control signal will be described more fully hereinafter. The output of the "or" gate 98 is returned to the computer by the RUN RETURN line.

"Run" command signals from the computer are transmitted over the RUN input line and applied to the inputs of an inverter 104 and a DELAY "A" ONE-SHOT 106. The "run" command signal also is supplied as a control signal RUN (P) to circuitry in FIGURE 4(*c*). The output of the inverter 104 is applied as an input to another inverter 107, the output of which is supplied to a third input of the "or" gate 98. The output of this "or" gate 98, which output is the RUN RETURN, is high whenever the "run" command is present or the REWIND FLIP-FLOP 86 is set by a "rewind" command pulse. It may be seen from FIGURE 2 that the RUN RETURN signal supplied to the computer from the "or" gate 98 is th same as that required of a tape station.

The output of the inverter 104 supplies a control signal RUN (N) for use elsewhere in the control unit. The inverter 164 output also is applied to the input of a DELAY "A" ONE-SHOT 110. The output of this one-shot 110 is supplied as a control signal RUN $LEAD_1$ (P) to other circuitry and also is applied to the input of a DELAY "B" ONE-SHOT 112. The latter one-shot 112 has an output designated RUN $LEAD_2$ (P) which is normally low, and which goes high for a short duration when the one-shot 112 is triggered.

The output of the DELAY "A" ONE-SHOT 106 is supplied as a control signal RUN $TRAIL_1$ (P) to other circuits in the control unit, and also is supplied as an input to a DELAY "B" ONE-SHOT 116. The latter one-shot 116 has an output designated RUN $TRAIL_2$ (P) which is normally low and which goes high temporarily when the one-shot 116 is triggered.

The various one-shots 106, 110, 112 and 116 operate as follows in response to a "run" command signal. The "run" command signal is a positive-going, or high voltage level 42, as illustrated in FIGURE 2. A delay one-shot requires a negative-going signal for triggering. Accordingly, the "run" command signal does not trigger the DELAY "A" ONE-SHOT 106. However, the "run" command signal or level is inverted by the inverter 104 to provide a waveform having a negative-going leading edge of the type illustrated in line (*a*) of FIGURE 3(*g*). This leading edge triggers the DELAY "A" ONE-SHOT 110 to provide a positive output pulse (line (*b*), FIGURE 3(*g*)). This output is applied as a control signal RUN $LEAD_1$ (P) to other circuitry in the unit and also is applied as input to the DELAY "B" ONE-SHOT 112. The trailing, or negative-going, edge of this output pulse triggers the DELAY "B" ONE-SHOT 112 to provide a positive pulse of short duration (line (*c*), FIGURE 3(*g*)). The output of this one-shot 112 is designated RUN $LEAD_2$ (P).

The RUN (P) signal has the same polarity and waveform as the "run" command signal. No triggering of the DELAY "A" ONE-SHOT 106 takes place while the "run" command signal is present. When the "run" command level terminates, however, the voltage at the input of the DELAY "A" ONE-SHOT 106 drops to a low level and triggers this one-shot 106. A positive pulse then appears at the one-shot 106 output. The output of the one-shot 106 is applied as input to the DELAY "B" ONE-SHOT 116 and also is used as a control signal RUN $TRAIL_2$ (P). The trailing edge of the positive pulse triggers the DELAY "B" ONE-SHOT to provide a positive pulse output RUN $TRAIL_2$ (P). The outputs of the various one-shots are designated either "lead" or "trail" to indicate that these outputs are initiated by either the leading edge or the trailing edge, respectively, of the "run" command signal. The numerical subscripts in the output designations signify the relative order of occurrence timewise of the various one-shot outputs.

The RUN $LEAD_2$ (P) control signal from the DELAY "B" ONE-SHOT 112 is applied to the (R) terminal of an END OF TAPE WARNING (ETW) flip-flop 120. This flip-flop 120 receives a positive pulse at the (S) terminal, under certain conditions to be described more fully hereinafter. This positive pulse is transmitted over a control line, WRITE NO-MATCH (P), from the file logic unit 32. This control line is one line of the multichannel cable 34 which interconnects the file logic unit 32 and the simulator and control unit 28. The output of the ETW FLIP-FLOP 120 at the (1) terminal is sent to the computer over the ETW RETURN line and also is supplied as a control signal ETW (1P) to circuitry in FIGURE 4(*c*).

The RUN $LEAD_1$ (P) signal and a signal $Q_2$ (1P) are applied to first and second inputs, respectively, of a two-input "and" gate 124. The RUN $TRAIL_2$ (P) signal and the output of the "and" gate 124 are applied to different inputs of a two-input "or" gate 126. The "or" gate 126 output is connected to the (R) input terminal of a BTL FLIP-FLOP 128. BTL is an abbreviation for "BEGINNING OF TAPE LEVEL." Signals SET $Q_2$ (P) and SET $Q_1$ (P) are applied to different inputs of a two-input "or" gate 130, the output of which is connected to the (S) input terminal of the BTL FLIP-FLOP 128. The output of this flip-flop 128 at the (1) terminal is sent to the computer over the BTL RETURN line, and also is applied to one input of the "and" gate 90 at the (R) terminal of the REWIND FLIP-FLOP 86 described previously. That the BTL FLIP-FLOP 128 and the ETW FLIP-FLOP 120 simulate the action of tape station circuitry, in sending return signals selectively to the computer, will be apparent from a later discussion.

The control portion of the simulator and control unit is illustrated in block diagram form in FIGURES 4(*b*) and 4(*c*). It is the function of the control portion to control the operation of the drum storage file logic 32. This control is exercised by the generation of status levels which are supplied to the file logic unit 32 by way of the multichannel cable 34 (FIGURE 4(*b*)). This cable 34 contains all of the control signal lines for two-way communication between the control unit 28 and the file logic unit 32. Also contained in this cable 34 are all of the information lines from the tape trunk 30.

At the right of FIGURE 4(*c*) is an INSTRUCTION COMPLETE FLIP-FLOP 300 which is in the reset state when a control function is being performed by circuitry in the control unit, and which is in the set state when no control function is being performed. The output IC (1P) at the (1) output terminal is low and the output at the (0) output terminal is high when the flip-flop is in the reset state. The latter output is coupled to a DELAY ONE-SHOT 302, the output IC LEAD (P) of which normally is low. The (S) input terminal of the INSTRUCTION COMPLETE FLIP-FLOP 300 is connected to the output terminal of a three-input "or" gate 304. Also connected to the output of the "or" gate 304 is a delay circuit 306 having a normally low output ICP (P).

A positive-going pulse is applied to the delay circuit 306 and to the (S) input terminal of the INSTRUCTION COMPLETE FLIP-FLOP 300 when the "or" gate 304 receives a high level signal on any of its inputs. The flip-flop 300 then changes state and the voltage at the (0) output terminal thereof goes low, triggering the DELAY ONE-SHOT 302 to provide a positive-going output pulse.

The IC LEAD (P) output of the DELAY ONE-SHOT 302 is applied to one input of a two-input "or" gate 200 (upper left FIGURE 4(*b*)). The RUN $LEAD_2$ (P) output of the DELAY "B" ONE-SHOT 112 (FIGURE 4(*a*)) is applied to the other input of this "or" gate 200. The "or" gate 200 output is connected to one input of a three-input "and" gate 202. The IC (1P) output from the (S) terminal of the INSTRUCTION COMPLETE FLIP-FLOP 300 and the REV (P) output of the REVERSE RETURN "or" gate 80 are applied to the other inputs of this "and" gate 202 output is coupled to the (S) input terminal of a first cuing $Q_1$ flip-flop 204 and also is supplied as an input signal SET $Q_1$ (P) to the "or" gate 130 in FIGURE 4(*a*).

The IC LEAD (P) signal output of the DELAY ONE-SHOT 302 and the RW (1P) output of the REWIND FLIP-FLOP 86 are applied as inputs to a two-input "and" gate 208. The outputs of this "and" gate 208 and another "and" gate 210 are connected to the inputs of an "or" gate 212. The IC (1P) output of the INSTRUCTION COMPLETE FLIP-FLOP 300 and the RW (P) output of the DELAY "B" ONE-SHOT 88 are coupled to first and second inputs of the "and" gate 210. The "or" gate 212 output is coupled to the (S) input terminal of a second cuing $Q_2$ flip-flop 214 and also is supplied as an input signal to the "or" gate 130 of FIGURE 4(*a*). The ICP (P) output of the delay device 306 of FIGURE 4(*c*) is applied to the (R) input terminals of the $Q_1$ and $Q_2$ FLIP-FLOPS 204 and 214. These flip-flops are so-named because of the function they perform in "cuing" or preparing certain "and" gates for operation in response to the next command signals received from the computer.

One output of each of the "cuing" flip-flops $Q_1$ and $Q_2$ is applied to each of a set of multi-input "and" gates 220 . . . 228 in FIGURE 4(*b*) and "and" gates 310 and 312 in FIGURE 4(*c*). The (1) output terminal of the $Q_1$ FLIP-FLOP 204 is connected to an input of each of the "and" gates 220, 222 and 224. The (0) output terminal of this flip-flop 204 is connected to an input of each of the "and" gates 226, 228, 310 and 312. The (1) output terminal of the $Q_2$ FLIP-FLOP 214 is connected to one input of each of the "and" gates 224, 226 and 228, and to one input of each of the "and" gates 90 and 124 of FIGURE 4(*a*). The (0) output terminal of this flip-flop 214 is connected to one input of each of the "and" gates 220, 222, 310 and 312.

The RUN $LEAD_2$ (P) output of the DELAY "B" ONE-SHOT 112 (FIGURE 4(*a*)) is coupled to another input of each of the "and" gates 220, 224, 226 and 228. "And" gates 220, 224, 228 and 312 also receive a WRITE (P) input. The READ (N) output of the inverter 70 (FIGURE 4(*a*)) is applied to one input of each of the "and" gates 222, 226 and 310. The remaining input of the "and" gate 222 is the RUN $LEAD_1$ (P) output of the DELAY "A" ONE-SHOT 110. The "and" gate 310 receives the FWD (P) output from the (0) terminal of the REVERSE FLIP-FLOP 74. The remaining input to each of the "and" gates 310 and 312 comes from a pair of "and" gate 314, 316 by way of an "or" gate 318. The IC LEAD (P) signal output of the DELAY ONE-SHOT 302 and the RUN (P) signal (FIGURE 4(*a*)) are supplied to the inputs of the "and" gate 314. The other "and" gate 316 receives the IC (1P) output of the INSTRUCTION COMPLETE FLIP-FLOP 300 and the RUN $LEAD_2$ (P) output of the DELAY "B" ONE-SHOT 112.

A set of bistable circuits, illustrated as flip-flops 230 . . . 238 and 320 . . . 324 function as status level generators, which control the operation of the file logic 32 circuitry in a manner to be described. Each of these flip-flops, when in the set state, provides a high voltage level at its (1) output termnal for effecting control of a different logic operation in the file logic unit 32. The (1) output terminals are connected to different points in the file logic unit 32 by way of control lines contained in the multichannel cable 34. As will be apparent from a later discussion, only one of these flip-flops 230 . . . 238 and 320 . . . 324 can be in the set state at any one time. The flip-flops are given designations which are abbreviations for the operations which the flip-flops control in the particular, illustrative system of FIGURE 5. The abbreviations and the meanings thereof are as follows:

TS—TRACK SELECTION
TCR—TRACK COMPARE READ
TW—TRACK WRITE
TR—TRACK READ

CT—CRITERION TRANSFER
MCR—MESSAGE COMPARE READ
MCW-R—MESSAGE COMPARE WRITE-READ
MCW-W—MESSAGE COMPARE WRITE-WRITE

The (S) input terminal of each of the status level flip-flops 230 . . . 238, 320 and 322 is connected to the output of a different one of the set of "and" gates 220 . . . 228, 310 and 312, respectively, described previously. The output of each of these "and" gates also is connected to a different input of a multi-input "or" gate 330, the output of which is connected to the (R) input terminal of the INSTRUCTION COMPLETE FLIP-FLOP 300. A positive-going output signal from any of these "and" gates sets the corresponding status level flip-flop and resets the INSTRUCTION COMPLETE FLIP-FLOP 300 through the "or" gate 330. The status level flip-flops 230 . . . 238 and 320 . . . 324 are reset by a positive-going signal output from the delay unit 306. The delay 306 output is applied to the (R) terminal of the MCW-R FLIP-FLOP 322 through an "or" gate 326, and also is supplied by way of the cable 34 to the file logic unit 32.

The MCW-W FLIP-FLOP 324 is set by a positive-going output from a two-input "and" gate 334. One input to this "and" gate 334 is the (0) output of the MCW-R FLIP-FLOP 322; the other input is the output of a delay device 336. A signal WRITE MATCH (P) from the file logic unit 32 provides the input to the delay device 306 and also to a second input of the "or" gate 326.

The (0) output terminals of the flip-flops 230, 232, 236, 238 and 320 are connected by way of inverters 340 . . . 348, respectively, to different inputs of a multi-input "or" gate 350. The "or" gate 350 output is connected to one input of a two-input "and" gate 356. The RUN TRAIL$_2$ (P) output of the DELAY "B" ONE-SHOT 116 (FIGURE 4(*a*)) is connected to the second input of this "and" gate 356 and to the first input of another two-input "and" gate 358. The second input of the latter "and" gate 358 is the (1) output of the ETW FLIP-FLOP 120.

Signals designated ED (P) and EM (P) are transmitted from the file logic unit 32 over separate lines in the cable 34 to different inputs of a two-input "or" gate 366. ED and EM are abbreviations for "End of Data" and "End of Message," respectively. The output of the "or" gate 366 is fed through a delay device 368 to one input of the "or" gate 304. The outputs of the "and" gates 356 and 358 provide the other inputs to the "or" gate 304.

FILE LOGIC UNIT 32

The file logic unit 32 and the file 26 of FIGURE 1 may take several different forms, depending upon the type of file used and the logic operations which it is desired to perform. These units 26, 32 do not form a part of the invention of themselves, and, as discussed hereinabove, an entirely different type of equipment may be connected to, and controlled by, the simulator and control unit 28 of the present invention. However, in order to demonstrate the utility of the invention, there is illustrated in FIGURE 5, by way of example, a simplified block diagram of a file logic unit 32 and file 26 which may be controlled by the simulator and control unit 28.

The drum file 26 may be, for example, one or more multi-track magnetic drums (not shown) having a combination read-write head for each track. The digits of a character may be recorded serially on a single track or in parallel in parallel tracks, as preferred in a particular application and depending upon the logic circuitry. In particular, the drum and the code scheme used in the recording thereon may be of the type described in the article in the March 1959 issue of the Proceedings of the Western Joint Computer Conference at pages 197–203. As described in that article, digits of a character are recorded serially in a single track, and any track may have many messages recorded thereon, the particular number being a function of the length of the messages.

The particular coding scheme described in the article differs from that employed in most computer systems. The file logic to be described here, however, is general in nature and, accordingly, the special circuitry required to handle a particular type of coding scheme for recording on the drum will not be described further.

It will be assumed, however, that information supplied from the computer by way of the cable 34 is parallel in form and transmitted over multiple lines 34*a*. Clock pulses also may be transmitted from the computer over one of these lines 34*a*. It will also be assumed, for purposes of illustration, that information is recorded serially on the drum. Whatever the particular code format used in recording, it will be assumed that each message is bracketed by special start message (SM) and end message (EM) coded symbols. Individual items in a message may be separated by special coded item separator symbols, which are unimportant to the present discussion. The last message recorded on a track, and also the last message transmitted from the computer for recording a track, ends with a special end of data (ED) coded symbol. The last message in the file may be followed by a special end of file (EF) symbol. The above system of message identification is known in the art.

The read-write heads for the individual drum tracks are selectively connected to a write amplifier unit 402 and a read amplifier unit 404 by way of a switching unit 400. The switching unit 400 may include, for example, a relay-type decoding matrix which operates to close the path between a selected read-write head and the write 402 and read 404 units in accordance with track address information stored in a track address register 406. The input and output lines of the track address register 406 are multichannel lines for transmitting the digits of a character in parallel. Multichannel lines here and elsewhere in the drawing are indicated by heavy lines.

Information from the computer for selecting a desired track is transmitted to the track address register 406 by way of a set of "and" gates 408. A separate "and" gate is provided for each digit position of a transmitted character. Only a single "and" gate 408 is shown for clarity of drawing. A second input to each of the "and" gates 408 is the TS (1P) output of the TS FLIP-FLOP 230 (FIGURE 4(*b*). The TS (1P) status level and all other status levels and control signals from the control unit 28 are transmitted to the file logic unit 32 over lines 34*b* in the connecting cable 34.

The single output of the read unit unit 404 is connected to one input of a two-input "and" gate 409. The "and" gate 409 receives a second input from a multi-input "or" gate 410. This "or" gate receives the status levels TR (1P), TCR (1P), MCR (1P) and MCR-R (1P) at separate inputs and provides a high level output for enabling the "and" gate 408 whenever any of the status level inputs is high. These status levels control the various read operations. The "and" gate 409 output is supplied to a REGISTERS AND CODE CONVERTERS UNIT 412. This unit includes the necessary circuitry for converting the serial read information to parallel form, and for converting the code from that used in the file recording to that used in the computer, assuming the codes are different. A local oscillator (not shown) may provide timing pulses for clocking the information. Alternatively, a self-clocked reading arrangement of the type illustrated on page 201 of the article aforementioned may be used with certain coding schemes.

The REGISTERS AND CODE CONVERTERS unit 412 also includes registers for converting data, to be recorded, from parallel to serial form and for accomplishing any desired change in code conversion. Information to be recorded is supplied to this unit 412 over multichannel lines 414 from a set of "and" gates 416, shown for clarity as a single "and" gate. The information signals are supplied to the "and" gates 416 by branch lines connected to the multilines 34*a*. The "and" gates 416 are enabled by a high level output from an "or" gate 418 which receives the status levels TW (1P) and MCW–W (1P) for controlling write operations. The information to be recorded is supplied by the unit 412 to a single "and" gate 420, the output of which is connected to the input of the write unit 402. The "and" gate 420 is enabled by the output of an "or" gate 422 whenever either of the write status levels TW (1P) and MCW–W (1P) is high.

An end of data, ED symbol recognition gate (EDR) 424 and an end of message, EM, symbol recognition gate (EMR) 426 are connected to the information lines 414 at the output of the "and" gates 416. These recognition gates may be, for example, of the type illustrated and described in the Rivas Patent 2,926,337, entitled "Data Selection Device." The EDR gate 424 provides an output in response to recognition of the ED coded symbol. The EMR gate 426 provides an output in response to recognition of the EM coded symbol. The latter output is applied at one input of a two-input "and" gate 428, which is enabled when the MCW–W (1P) status level is high. The "and" gate 428 output EM (P) and the EDR gate 424 output ED (P) are transmitted over lines in the cable 34*c*, which is part of the interconnecting cable 34, to the "or" gate 366 in the INSTRUCTION COMPLETE circuitry (FIGURE 4(*c*)).

The read data output of the REGISTERS AND CODE CONVERTERS unit 412 is supplied to (1) a comparator 432, (2) an end of data recognition gate (EDR) 434, (3) a set of "and" gates 436, and (4) a set of "and" gates 438. The comparator 432 may be of the general type illustrated and described in the copending application of Rettig et al., Serial No. 1707, filed January 11, 1960, for "Search Apparatus," and assigned to the assignee of the present invention (now Patent No. 3,197,742, issued July 27, 1965). Any other known comparator of suitable type can be used to provide the comparing function, for example, the comparator described in Patent No. 2,967,-296, issued January 3, 1961 to Chien et al. and assigned to the assignee of the present invention. The comparator 432 receives a search criterion input from a criterion register 440. The criterion is transmitted from the computer over multichannel lines 34*a* to the criterion register 440 by way of a set of "and" gates 442, which are enabled when the status level CT (1P) is high. The comparator 432 is enabled by the output of an "or" gate 444, which receives the status levels TCR (1P), MCR (1P) and MCW–R (1P). The comparator 432 provides an output, when energized by the "or" gate 444, when the input from the unit 412 matches the input from the criterion register 440. The comparator 432 output is supplied (1) to one input of an "and" gate 450, (2) to the (S) input of a flip-flop 452, and (3) to one input of each of the set of "and" gates 438.

The single "and" gate 450 is enabled when the status level MCW–R (1P) is high. The output of this "and" gate 450 is transmitted as a control signal WRITE MATCH (P) to the status level generators MCW–R 322 and MCW–W 324 (FIGURE 4(*c*)) by way of the interconnecting cable 34. The MCW–R (1P) status level also enables an "and" gate 460 which receives the output of the EDR gate 434. The "and" gate 460 output, labelled WRITE NO MATCH (P) is transmitted to the ETW flip-flop 120 (FIGURE 4(*a*)) by way of the cable 34.

The flip-flop 452 is reset by the ICP (P) output of the delay device 306 (FIGURE 4(*c*)). The (0) output terminal of the flip-flop 452 is connected to one input of a two-input "and" gate 464. This "and" gate 464 is enabled by the output of an "or" gate 466 when either of the status levels TCR (1P) and MCR (1P) is high. The output of the "and" gate 464 is connected to one input of each of a set of "and" gates 468. A second input to each of the "and" gates 468 is connected to the output of the EDR gate 434. The output of an end file (EF) symbol generator 470 is transmitted through the set of "and" gates 468, when enabled, to the inputs of a like number of "or" gates 474. The END FILE SYMBOL GENERATOR may be, for example, a register.

The "or" gates 474 transmit the data outputs of "and" gates 436, 438 and 468 to the computer by way of multichannel lines 34*d*, which are contained in the interconnecting cable 34, and cable 30. The "and" gates 436 are enabled when the status level TR (1P) is high. The "and" gates 438 are primed by the output of an "or" gate 480 when either of the status levels TCR (1P) and MCR (1P) is high.

OPERATION

All operational procedures originate at the computer utilizing tape station instructions to initiate the control functions of the simulator and control unit 28. Inasmuch as the number of status levels required for controlling the various file operations to be described is greater than the number of available tape commands, combinations of instructions are used to select the operating mode, where the type and sequence of instructions is controlling. In a sense, the control unit 28 operates as an external, wired program device.

A description of each operation and the sequence of tape operation codes required to accomplish each operation are listed below. The last operation code in the sequence of instructions is consistent with the use of that code in a tape station operation. For example, in a write operation, the operation code in the last instruction of a sequence is either a SECTOR WRITE or a LINEAR WRITE. The REWIND operation code and the REWIND N SYMBOLS operation code are used in a special way as "cuing" instructions to prime various logic circuits in the control unit, whereby the next command signals are passed by fully primer circuits to set a desired status level generator.

I. TRACK SELECTION (TS)

The track selection (TS) mode of operation is used to transfer the track address information from the computer to the track address register 406 (FIGURE 5) for connecting a selected read-write head in the drum file 26 to the read 404 and write 402 units. Initially, all flip-flops except the INSTRUCTION COMPLETE FLIP-FLOP 300 are in the reset state. These flip-flops may be initially controlled by a manual switch such as a start switch (not shown). All status levels supplied to the file logic 32, therefore, are low. Operation is commenced by the REWIND N SYMBOLS operation code. "Run" and "reverse" command levels are transmitted to the simulator and control unit 28. The "reverse" command level sets the REVERSE FLIP-FLOP 74 (FIGURE 4(*a*)), and the low output at the (0) terminal thereof is inverted and supplied as a high level to the "or" gate 80. The high level output of the "or" gate is returned to the computer 10 by way of the REVERSE RETURN line, and also is applied as a signal REV (P) to one input of the "and" gate 202 (FIGURE 4(*b*)). The IC (1P) input to this "and" gate 202 is also high at this time because the INSTRUCTION COMPLETE FLIP-FLOP is in the set state.

The "run" command level, which is now high, is inverted by the inverter 104 (FIGURE 4(*a*)) and applied as a low level signal to the inverter 106. The high output of the latter inverter 107 is coupled to the "or" gate 98, and a high level return signal is sent to the computer 10 over the RUN RETURN line. The output of the inverter 104 triggers the DELAY "A" ONE-SHOT 110 to provide a positive output pulse, the trailing edge of which triggers the DELAY "B" ONE-SHOT 112. The positive output pulse RUN $LEAD_2$ (P) from the latter one-shot 112 fully enables the "and" gate 202 (FIGURE 4(*b*)) through the "or" gate 200. The positive output pulse from the "and" gate 202 sets the cuing flip-flop 204 directly, and sets the BTL FLIP-FLOP 128 (FIGURE 4(*a*)) by way of the "or" gate 130. The high level output at the (1) terminal of the BTL FLIP-FLOP is returned to the computer over the BTL RETURN line to terminate the instruction (refer to the description of FIGURE 2). The high level "reverse" and "run" command signals terminate with the termination of the instruction. The trailing edge of the "run" command signal triggers the DELAY "A" ONE-SHOT 106, and the trailing edge of the one-shot 106 output triggers the DELAY "B" ONE-SHOT 116. The positive pulse output of the latter one-shot 116 resets the BTL FLIP-FLOP 128 through the "or" gate 126. The output of the DELAY "B" ONE-SHOT 116 also resets the REVERSE FLIP-FLOP 74.

The next instruction includes either the LINEAR WRITE or SECTOR WRITE operation code and the memory addresses of information to be transferred to the track address register 406. "Write" and "run" command levels are transmitted to the simulator and control unit 28. The high level on the WRITE input line is returned to the computer over the WRITE RETURN line and also is applied as a positive level WRITE (P) to the "and" gate 220. The "and" gate 220 also receives high inputs from the (1) terminal of the $Q_1$ flip-flop 204 and the (0) terminal of the $Q_2$ flip-flop 214 at this time. The "run" command signal is inverted by the inverter 104. The output of the inverter 104, which is a negative-going level, is inverted and returned to the computer over the RUN RETURN line by way of the "or" gate 98. The inverter 104 output triggers the DELAY "A" ONE-SHOT 110 which, in turn, triggers the DELAY "B" ONE-SHOT 112. The positive pulse output of the latter one-shot 112 is coupled to the "and" gate 220 (FIGURE 4(*b*)). The "and" gate 220 output then goes high because all inputs thereto are high. The high output sets the TS FLIP-FLOP 230, and resets the INSTRUCTION COMPLETE FLIP-FLOP 300 (FIGURE 4(*c*)) by way of the "or" gate 330.

The high status level at the (1) output terminal of the TS FLIP-FLOP 230 (FIGURE 4(*b*)) enables the set of "and" gates 408 (FIGURE 5), whereby the track address data from the computer is fed to the track address register 406. The switching unit 400, as described previously, connects that read-write head in the drum file 26 corresponding to the address in the register 406 to the write unit 402 and read unit 404. No reading of, or writing on, the drum takes place during this mode, however.

The low level output TW (0P) at the (0) terminal of the TS FLIP-FLOP 230 is inverted by an inverter 340 and applied to one input of the "or" gate 350 (FIGURE 4(*c*)). The high output of the "or" gate 350 primes one input of the "and" gate 356. The instruction is terminated automatically in the computer after the last character of the track address information is transmitted from the computer to the track address register 406. The "write" and "run" command levels then terminate, and the positive output pulse from the DELAY "B" ONE-SHOT 116 activates the "and" gate 356. The "or" gate 304 then supplies a positive pulse to the delay device 306 and to the (S) terminal of the INSTRUCTION COMPLETE FLIP-FLOP 300. The output of the delay device 306 resets the TS FLIP-FLOP 230 and the $Q_1$ FLIP-FLOP 204. The RUN RETURN level is high until the INSTRUCTION COMPLETE FLIP-FLOP 300 is set because the output thereof is coupled to the "or" gate 98 (FIGURE 4(*a*)) through an inverter 100. The apparatus is now ready for the next instruction.

II. CRITERION TRANSFER (CT)

The criterion transfer mode of operation is used to transfer a criterion of search from the computer, for example from the high speed memory, to the criterion register 440 (FIGURE (5)) for comparision with information to be read from the drum file 26. Information is transferred to the criterion register 440 by way of a set of "and" gates 442 which are enabled when the CT (1P) status level is high. Accordingly, the CT FLIP-FLOP 238 must be in the set state to effect a criterion transfer.

All flip-flops except the INSTRUCTION COMPLETE FLIP-FLOP 300 initially are in the reset state. The IC (1P) output then is high and the IC LEAD (P) output is low. Operation is commenced by an instruction which includes the REWIND operation code. A "rewind" command pulse is transmitted by the computer. The trailing edge of this pulse triggers the DELAY "A" ONE-SHOT 84 to provide a positive output pulse. This latter pulse sets the REWIND FLIP-FLOP 86, causing REVERSE RETURN and RUN RETURN signals to be sent to the computer by the "or" gates 80 and 98, respectively.

The positive output pulse RW (P) from the DELAY "B" ONE-SHOT 88 activates the "and" gate 210, and the positive pulse output of this gate 210 is passed by the "or" gate 212. The "or" gate 212 output sets the $Q_2$ FLIP-FLOP 214, and sets the BTL FLIP-FLOP 128 (FIGURE 4(*a*)). The high output at the $Q_2$ FLIP-FLOP 214 (FIGURE 4(*b*)) enables each of the "and" gates 224, 226, 228, 90 and 124. The high output at the (1) output terminal of the BTL FLIP-FLOP 128 is transmitted to the computer over the BTL RETURN line to terminate the instruction and also is applied to a second input of the "and" gate 90. The high output of this "and" gate resets the REWIND FLIP-FLOP 86 to terminate the REVERSE RETURN and the RUN RETURN signals.

The next instruction includes the SECTOR WRITE operation code. "Write" and "run" command signals are then transmitted by the computer. The "write" command causes a WRITE RETURN to be sent to the computer from the simulator and control unit 28. The WRITE (P) signal is high at this time and is applied to one input of the "and" gate 228 (FIGURE 4(*b*)). The "run" command signal is inverted and applied to the DELAY "A" ONE-SHOT 110 and to the inverter 106. The output of the inverter 106 supplies a positive input to the "or" gate 98 and a RUN RETURN signal is sent to the computer. The DELAY "A" ONE-SHOT 110 output enables the "and" gate 124, the output of which resets the BTL FLIP-FLOP 128 by way of the "or" gate 126. The DELAY "A" ONE-SHOT 110 output triggers the DELAY "B" ONE-SHOT 112 and the positive output pulse RUN $LEAD_2$ (P) therefrom activates the "and" gate 228. The remaining input $Q_1$ (0P) is high at this time because the "cuing" flip-flop 204 is in the reset state. The positive output of the "and" gate 228 sets the CT FLIP-FLOP 238, and resets the INSTRUCTION COMPLETE FLIP-FLOP 300 by way of the "or" gate 330.

The CT (0P) output of the CT FLIP-FLOP 238 is inverted and applied as a positive input to the "or" gate 350, the positive output of which primes one input of the "and" gate 356. The CT (1P) status level is now high and activates the "and" gates 442 at the input of the criterion register 440. The search criterion transmitted from the computer by way of trunk 30 and cable 34 is gated into the criterion register 440 by way of the "and" gate 442. The instruction is terminated by the computer at the end of the criterion transmission. The "write" and "run" command signals then terminate. The trailing edge of the "run" command signal triggers the DELAY "A" ONE-SHOT 106. The trailing edge of the output pulse of this one-shot 106 triggers the DELAY "B" ONE-SHOT 116. The positive pulse output RUN $TRAIL_2$ (P) therefrom activates the "and" gate 356. The positive output of the "and" gate 356 is passed by the "or" gate 304 to the delay device 306 and also to the (S) terminal of the INSTRUCTION COMPLETE FLIP-FLOP 300. The output of the delay device 306 resets the CT FLIP-FLOP 238 and the $Q_2$ FLIP-FLOP 214. The apparatus is then ready for the next operation.

III. TRACK COMPARE READ (TCR)

The track compare read mode of operation is used to read all messages on a particular track of the drum and to transfer to the computer all messages on this track which have a predetermined criterion. Operation is commenced by first selecting the desired track, as described above under I. TRACK SELECTION, and transferring the criterion of interest to the criterion register 440, as described above under II. CRITERION TRANSFER. All flip-flops except the INSTRUCTION COMPLETE FLIP-FLOP 300 initially are in the reset state. The next instruction includes the REWIND N SYMBOLS operation code. "Reverse" and "run" command signals are transmitted by the computer. The effect of these command signals is described above under I. TRACK SELECTION and will not be repeated except to say that the cuing flip-flop $Q_1$ 204 and the BTL FLIP-FLOP 128 are set. The instruction is terminated by the BTL RETURN, and the output of the DELAY "B" ONE-SHOT 116 resets the BTL FLIP-FLOP 128 by way of the "or" gate 126.

The next instruction includes the BLOCK READ operation code. This instruction causes a "run" command signal to be sent to the simulator and control unit 28. A RUN RETURN is sent to the computer in response to this command in the manner described previously. The positive pulse output of the DELAY "A" ONE-SHOT 110 activates "and" gate 222. The READ (N) input to this "and" gate 222 is high in the absence of a "write" command. The positive output of the "and" gate 222 sets the TCR FLIP-FLOP 232, and resets the INSTRUCTION COMPLETE FLIP-FLOP 300 by way of the "or" gate 330.

The TCR (1P) status level is then high. This status level (1) enables the comparator by way of "or" gate 444, (2) enables the "and" gate 409 at the output of the read unit 404, (3) primes one input of the "and" gate 464, and (4) primes one input of each of the "and" gates 438 by way of "or" gate 480. Information on the selected track of the drum is transmitted through the read converters unit 412. The information is converted uni 404 and "and" gate 408 to the registers and code converters unit 412. The information is converted to parallel form in this unit 412. Any required code conversion also is performed in this unit. The output of this unit 412 is sent to the comparator 432, to the EDR gate 434 and to the sets of "and" gates 436 and 438. The "and" gates 436 are not enabled because the TR (1P) status level is low.

The comparator 432 compares the output of the unit 412 with the search criterion stored in the criterion register 440. Comparison starts, by means not shown, with the first message on the selected track. The criterion portion of a message is usually the first item of the message. If a criterion match is found, the comparator 432 activates the "and" gates 438, and these gates 438 pass the associated data output of the unit 412 to the output information lines **34*d* by way of the "or" gates 474. The output signal of the comparator 432 terminates at the end of the message being transferred. There may be several messages recorded on the selected track, each having the predetermined criterion. In this event, each such message is transmitted to the computer by way of the "and" gates 438 and "or" gates 474**.

The output of the comparator 432 also sets the flip-flop 452 to remove the enabling level from the "and" gate 464. In the event that no message having the criterion of interest are recorded on the selected track, the flip-flop 452 remains reset, and the "and" gates 468 are enabled by the output of the "and" gate 464. The end of data, ED, symbol at the end of the track is recognized by the EDR gates 434, the output of which activates the "and" gates 468. An end of file symbol is transmitted through these "and" gates 468 and "or" gates 474 to the computer. The instruction terminates automatically in the computer after a predetermined gap in the transmission. The "run" command signal then terminates, and the RUN $TRAIL_2$ (P) output of the DELAY "B" ONE-SHOT 116 sets the INSTRUCTION COMPLETE FLIP-FLOP 300 by way of the "and" gate 356 and the "or" gate 304. The output of the "or" gate 304 is applied to the delay device 306, the output of which (1) resets the flip-flop 452 (FIGURE 5), (2) resets the TCR FLIP-FLOP 232, and (3) resets the $Q_1$ flip-flop 304. The apparatus is then ready for the next operation.

IV. TRACK WRITE (TW)

During the track write mode of operation it is desired to write a new track of information on the drum. Operation is commenced by an instruction which includes the REWIND N SYMBOLS operation code. Response of the circuitry in the simulator and control unit 28 to the "reverse" and "run" command signals transmitted from the computer for this operation code are given above under I. TRACK SELECTION. The "cuing" flip-flop $Q_1$ 204 is set, as is the BTL FLIP-FLOP 128. The BTL RETURN set to the computer from the BTL FLIP-FLOP 128 terminates the instruction and the command signals. The RUN $TRAIL_2$ (P) output of the DELAY "B" ONE-SHOT 116 then resets the BTL FLIP-FLOP 128 by way of the "or" gate 126.

The next instruction includes the REWIND operation code. The response of the circuitry in FIGURE 4 to the "rewind" command pulse has already been discussed under II. CRITERION TRANSFER, and will not be repeated. The "cuing" flip-flop $Q_2$ and the BTL FLIP-FLOP 128 are set in response to the "rewind" command. The BTL RETURN from the latter flip-flop 128 terminates the instruction and the "rewind" command. The REWIND FLIP-FLOP 86 is reset by the BTL (1P) output through the "and" gate 90.

The next instruction includes the SECTOR WRITE operation code. The "run" and "write" command signals are transmitted to the control unit 28 in response to this operation code. A positive signal WRITE (P) is applied to one input of the "and" gate 224 (FIGURE 4(*b*)). This "and" gate 224 also receives high inputs from the cuing flip-flops 204 and 214. The "run" command signal is inverted to provide the RUN RETURN and to trigger the DELAY "A" ONE-SHOT 110. The output thereof, RUN $LEAD_1$ (P), resets the BTL FLIP-FLOP 128 by way of "and" gate 124. The one-shot 110 output also triggers the DELAY "B" ONE-SHOT 112 to provide a positive pulse for activating the "and" gate 224. The output of this "and" gate 224 resets the INSTRUCTION COMPLETE FLIP-FLOP 300 by way of the "or" gate 330 and sets the TW FLIP-FLOP 234 to provide at the (1) output thereof a high status level, TW (1P).

The TW (1P) status level enables the "and" gates 416 and 420 (FIGURE 5) by way of "or" gates 418 and 422, respectively. The information to be recorded on the drum track is passed by the "and" gates 416 to the REGISTERS AND CODE CONVERTERS UNIT 412, and from this unit through the "and" gate 420 to the write amplifier unit 402. It will be understood that the desired track is first selected by a track selection mode of operation.

The instruction terminates in the computer after all of the information has been transmitted from the computer. The EDR gates recognize the end of data, ED, symbol at the end of the transmitted information and send a control signal, ED (P), to the "or" gate 366. The output of this "or" gate 366 is delayed and applied as a positive input to the "or" gate 304. The output of this "or" gate 304 sets the INSTRUCTION COMPLETE FLIP-FLOP 300, and resets the TW FLIP-FLOP 234 and "cuing" flip-flops 204, 214 by way of the delay device 306.

V. TRACK READ (TR)

The track read mode of operation is used when it is desired to transfer an entire track of information to the computer. The desired track is first selected by a track select mode of operation, described above. The next instruction then includes the REWIND operation code. Response of the circuitry to the "rewind" commind signal is described above. The "cuing" flip-flop $Q_2$ 214 and the BTL FLIP-FLOP 128 are set, and a BTL RETURN to the computer terminates this instruction.

The next instruction includes the BLOCK READ operation code, and a "run" command signal is sent to the simulator and control unit 28. The READ (N) output of the inverter 70 is high at this time in the absence of the "write" command signal. The READ (N) output primes one input of the "and" gate 226. The $Q_1$ (0P) input to this gate is high because the "cuing" flip-flop 204 is reset. The RUN $LEAD_1$ (P) ouput of the DELAY "A" ONE-SHOT 110 resets the BTL FLIP-FLOP 128. The RUN $LEAD_2$ (P) output of the DELAY "B" ONE-SHOT 112 activates the "and" gate 226, and the output thereof resets the INSTRUCTION COMPLETE FLIP-FLOP 300, by way of the "or" gate 330, and sets the TR FLIP-FLOP 236.

The status level TR (1P) is high when the TR FLIP-FLOP 236 is in the set state. This status level enables the "and" gate 409 at the output of the read unit 404 and enables the set of "and" gates 436 (FIGURE 5). The information recorded on the selected track is then transmitted to the computer by way of the read unit 404, "and" gate 409, REGISTERS AND CODE CONVERTERS UNIT 412, "and" gates 436, and "or" gates 474. Transfer of information commences with the first message on the track, by means not shown, and ends with the ED symbol after the last message.

The (0) output of the TR FLIP-FLOP 236 is inverted, and the inverted output primes one input of the "and" gate 356 (FIGURE 4(*c*)) by way of the "or" gate 350. The instruction is terminated in the computer when the end of data, ED, symbol is received in the computer. The "run" command signal then terminates and the RUN $TRAIL_2$ (P) output of the DELAY "B" ONE-SHOT 116 activates the "and" gate 356. The positive output of this "and" gate 356. The positive output of this "and" gate 356 sets the INSTRUCTION COMPLETE FLIP-FLOP 300 and applies a positive signal to the delay device 306 by way of the "or" gate 304. The output of the delay device 306 resets the "cuing" flip-flop 214 and the TR FLIP-FLOP 236.

VI. MESSAGE COMPARE READ (MCR)

It is assumed that the correct track has been selected and a search criterion transferred to the criterion register 440. The MCR operation searches the selected track for a message having the search criterion and sends the data associated with the first criterion match back to the computer.

No "cuing" instructions are required for the MCR mode of operation. Operation is commenced by an instruction which includes the LINEAR READ operation code. A "run" command signal is transmitted from the computer to the simulator and control unit 28. The RUN $LEAD_2$ (P) output of the DELAY "B" ONE-SHOT 112 is applied to an "and" gate 316. The second input IC (1P) to this "and" gate 316 is high at this time, and the "and" gate sends a positive pulse to the "or" gate 318. The positive ouput of the "or" gate 318 primes one input of a 5-input "and" gate 310. The $Q_2$ (0P) and $Q_1$ (0P) inputs to the "and" gate 310 are high because the "cuing" flip-flops 204 and 214 are in the reset state. The READ (N) input to the "and" gate 310 also is high because no "write" command signal was transmitted by the computer. The FWD (P) input to the "and" gate 310 is high because the REVERSE FLIP-FLOP 74 is in the reset state. A positive pulse output is thereby provided by the "and" gate 310 to set the MCR FLIP-FLOP 320, and to reset the INSTRUCTION COMPLETE FLIP-FLOP 300 by way of the "or" gate 330.

The MCR (1P) status level is high when the MCR FLIP-FLOP 320 is in the set state. This status level (1) activates the camparator 432 by way of the "or" gate 444, (2) enables the "and" gate 409 at the output of the read unit 404, (3) partially enables the "and" gates 438 by way of the "or" gate 480, and (4) partially enables the "and" gates 468 by way of the "and" gate 464. Comparisons between the criteria on the track and the search criterion is made on a character-by-character basis by the comparator, commencing with the criterion of first message on the selected track. The means for initiating comparison with the first message are not shown in FIGURE 5 inasmuch as such means are known in the art and form no part of the invention. The comparator 432 provides an output signal if a criterion match is found. This output sets the flip-flop 452 and activates the "and" gates 438. The message associated with the matched criterion is then transferred to the computer by way of the "and" gates 438, "or" gates 474 and information lines 34*d*. The last character transferred is the EM symbol at the end of the message. The EM symbol also is used to disable the output of the camparator 432.

The LINEAR READ instruction in the computer is terminated in response to receipt of either (1) an EM symbol or (2) an EF symbol. In the first case, described above, the EM symbol transferred to the computer over lines 34*d* terminates the "run" command. The RUN $TRAIL_2$ (P) output of the DELAY "B" ONE-SHOT 116 activates the "and" gate 356, the high output of which enables the "or" gate 304. The "or" gate output sets the INSTRUCTION COMPLETE FLIP-FLOP, and resets the MCW FLIP-FLOP 320 and the flip-flop 452 (FIGURE 5) by way of the delay device 306.

If no message on the selected track has the desired criterion, the end of data, ED, symbol following the last message on the track is recognized by the EDR gates 434. The output of the EDR gates 434 activates the "and" gates 468 and an end of file symbol, EF, is transmitted to the computer from the end of file symbol generator 470. This EF symbol terminates the instruction and the "run" command. The INSTRUCTION COMPLETE FLIP-FLOP 300 is set and the MCR FLIP-FLOP 320 is reset in the manner described above for the EM symbol.

VII. MESSAGE COMPARE WRITE (MCW)

In this mode of operation, it is desired to locate a particular criterion on a selected drum track, and record on the track a new message associated with this criterion. The desired track is first selected during a track selection mode (I. above). The criterion is then transferred to the criterion register 440 during a criterion transfer mode of operation (II. above). The apparatus is then ready to commence the message compare write mode of operation.

The latter mode of operation is carried out in two steps. The first step is a read mode, during which the selected track is searched for the criterion of interest. If no match is found, the ETW FLIP-FLOP 120 (FIGURE 4(*a*)) is set and an ETW RETURN terminates the instruction. The second step is a write mode. If a match is found, the message transferred from the computer is recorded on the track following the criterion. The operation will now be described, assuming that the desired track has been selected and the search criterion transferred.

No "cuing" instructions are required for the MCW mode of operation. The computer instruction includes the LINEAR WRITE operation code. "Run" and "write" command levels are transmitted by the computer. WRITE RETURN and RUN RETURN signals are transmitted to the computer from the simulator and control unit 28 in a manner described previously. The RUN $LEAD_2$ (P) output of the DELAY "B" ONE-SHOT 112 enables the "and" gate 316. The output of this "and" gate 316 enables the "or" gate 318, and the positive output of the latter fully enables the "and" gate 312. (All other inputs to "and" gate 312 are then high.)

The high output of the "and" gate 312 sets the MCW–R FLIP-FLOP 322, and resets the INSTRUCTION COMPLETE FLIP-FLOP 300 by way of the "or" gate 330. The MCW–R (1P) status level goes high and (1) activates the comparator 432 by way of "or" gate 444, (2) enables the "and" gate 409 at the output of the read unit 404, (3) primes one input of the "and" gate 450, and (4) primes one input of the "and" gate 460. Comparison between the criteria on the drum track and the search criterion are made on a character-by-character basis, commencing with the criterion of the first message on the track.

Consider first the operation in response to a criterion match. The comparator 432 provides an output signal which activates the "and" gate 450. This "and" gate 450 provides a high output, WRITE MATCH (P), which is transmitted over one of the control lines 34c to the delay device 336 and the "or" gate 326 of FIGURE 4(*c*). The "or" gate 326 output resets the MCW–R FLIP-FLOP 322, terminating the high MCW–R (1P) status level, and the output at the (0) terminal of the flip-flop 322 primes one input of the "and" gate 334. The output of the delay device 336 activates this "and" gate 334 and the high output of the latter sets the MCW–W FLIP-FLOP 324.

The status level MCW–W (1P) then goes high, and (1) enables the "and" gate 420 at the input of the write unit 402, (2) enables the "and" gates 416 in the input data transmission path, and (3) primes one input of the "and" gate 428. The transmitted message associated with the matched criterion is recorded on the drum track by way of the "and" gates 416, the REGISTERS and CODE CONVERTERS UNIT 412, the "and" gate 420 and the write unit 402. The EM symbol at the end of the transmitted message is recognized by the EMR gates 426, and the single output thereof activates the "and" gate 428. This "and" gate transmits a signal, EM (P), over one of the control lines 34c to the "or" gate 366 (FIGURE 4(*c*)). The "or" gate 366 output is delayed and applied as a positive signal to the "or" gate 304, the output of which resets the MCW–W FLIP-FLOP 324 through the delay device 306, and sets to INSTRUCTION COMPLETE FLIP-FLOP 300. The instruction is terminated automatically in the computer at the termination of the transmission.

Consider now the operation of the apparatus when no criterion match is found. The MCW–R FLIP-FLOP 322 is set and the file logic is in the read mode. The end of data symbol, ED, is recognized by the EDR gates 434, and the output thereof enables the "and" gate 460. This "and" gate 460 transmits a signal, WRITE NO MATCH (P), over one of the control lines 34c to the (S) terminal of the ETW FLIP-FLOP 120 (FIGURE 4(*a*)). This flip-flop 120 then sends an ETW RETURN to the computer to indicate that "no match" was made for this instruction. This of course is a pseudo ETW since in fact no tape is actually involved. The (1) output of the ETW FLIP-FLOP 120 primes one input of the "and" gate 358. This "and" gate is then activated by the positive pulse output RUN $TRAIL_2$ (P) of the DELAY "B" ONE-SHOT 116 when the "run" command level terminates. The output of the "and" gate 358 sets the INSTRUCTION COMPLETE FLIP-FLOP 300 by way of the "or" gate 304, and resets the MCW–R FLIP-FLOP 322 by way of the "or" gate 304, delay device 306, and "or" gate 326. Of course, the message associated with the selected criterion is transmitted from the computer to the simulator and control 28 during the operation, but no recording of this data on the track takes place because the "and" gates 416 and 420 never receive enabling signals in the absence of a criterion match. This is done so that the computer can properly terminate the write instruction. At the conclusion of this write instruction, the ETW condition is sensed to ascertain whether in fact a write has taken place.

HOLD CIRCUITRY

During any file operation, procesing by the control unit 28 of control signals, generated in response to a new instruction, is held up pending the completion of the file operation then in progress. However, in no way does a departure from normal tape station behavior result. During a write operation, for example, there may be a slight delay between the time the last data is transmitted by the computer, and the instruction terminated, and the time the track recording is complete. If a new instruction follows too closely after the terminated instruction, the newly transmitted command signals may have an adverse affect on the file operation, for example by prematurely setting one of the "cuing" flip-flops 204 or 214, or one of the status level flip-flops. Not only would such setting of a flip-flop disturb the operation then in progress, but also an undesired status line flip-flop might be set. Moreover, that flip-flop would be reset at the completion of the file operation then in progress by way of the "or" gate 304 and delay device 306. As a result of the above action, the operation dictated by the new instruction might never be carried out.

It is desired, therefore, that processing of the new instruction by the control unit 28 be held up until the operation in progress is completed. At the same time, however, the new command signals transmitted by the computer must be acknowledged without delay if the simulator and control unit 28 is to perform the function of simulating a tape station. That the latter function is properly performed under all circumstances may be seen from a review of the operation of the simulator circuitry of FIGURE 4(*a*).

The hold-off feature discussed above is accomplished by the action of the input circuitry to the "cuing" flip-flops 204, 214, (FIGURE 4(*b*)) and "and" gates 314 and 316 (FIGURE 4(*c*)) in cooperation with the INSTRUCTION COMPLETE FLIP-FLOP 300. Upon initiation of any file operation, the INSTRUCTION COMPLETE FLIP-FLOP 300 is placed in the reset state. The IC (1P) output of the flip-flop 300 then is low. The IC LEAD (P) output of the DELAY ONE-SHOT 302 also is low. The low IC (1P) signal is supplied to each of the "and" gates 202, 210 and 316. Consequently, none of these "and" gates 202, 210, 316 can provide a high, or positive, output pulse. The low IC LEAD (P) signal is applied to one input of each of the "and" gates 208 and 314 and, consequently, neither of these "and" gates can provide a high output. Therefore, none of the "cuing" flip-flops 204, 214, the MCR FLIP-FLOP 320 and the MCW–R FLIP-FLOP 322 can be set in response to a new instruction until the INSTRUCTION COMPLETE FLIP-FLOP is set at the termination of the operation then in progress.

By way of example, consider the response of the simulator and control unit 28 to a "REWIND" instruction transmitted by the computer while the apparatus is in the message compare write mode. Assume that the MCW–W FLIP-FLOP 324 is set and that a new message is being written on a drum track. The computer terminates the old instruction after the last character, EM, of the message is transmitted. The "run" command level then terminates. However, the MCW–W FLIP-FLOP remains in the set state, and processing of the transmitted data continues until the EM symbol is recognized by the EMR gates 426.

Suppose that the "rewind" command pulse is transmitted by the computer before the EM symbol is recognized. The "rewind" pulse triggers the DELAY "A" ONE-SHOT 84, and the output thereof sets the REWIND FLIP-FLOP 86. REVERSE RETURN and RUN RETURN levels are sent immediately to the computer, thus simulating a tape station action. The high RW (1P) level at the (1) terminal of the flip-flop 86 is applied at one input of the "and" gate 208, but this "and" gate is not enabled because the other input, IC LEAD (P), thereto is low. The positive pulse output RW (P) of the DELAY "B" ONE-SHOT 88 is applied at one input of the "and" gate 210, but this "and" gate 210 is not enabled because the other input IC (1P) thereto is then low. Consequently, the output of the "or" gate 212 remains low, and the BTL FLIP-FLOP 128 is not set at this time. No BTL RETURN is sent to the computer to terminate the instruction.

As soon as the EM symbol is recognized by the EMR gates 426, a signal EM (P) is sent to the "or" gate 366 (FIGURE 4(*c*)). The positive output of the "or" gate 366 is delayed and then applied to one input of the "or" gate 304. The output of this "or" gate 304 resets the MCW–W FLIP-FLOP 324, by way of the delay device 306, and also sets the INSTRUCTION COMPLETE FLIP-FLOP 300. The output at the (0) terminal of this flip-flop 300 goes low, triggering the DELAY ONE-SHOT 302 to provide a positive pulse IC LEAD (P). This positive pulse activates the "and" gate 208, since the other input RW (1P) thereto is then high. The resulting positive output of the "or" gate 212 sets the $Q_2$ FLIP-FLOP 214 and sets the BTL FLIP-FLOP 128. The BTL RETURN then is sent to the computer to terminate the "REWIND" instruction, and the outputs of the BTL FLIP-FLOP 128 and the $Q_2$ FLIP-FLOP 214 reset the "REWIND" FLIP-FLOP 86.

The "hold off" feature of the apparatus may be summarized as follows. If new command signals, corresponding to a new instruction, are transmitted to the simulator and control unit 28 while a file operation is in process, the simulator and control unit 28: (1) acknowledges the command signals by sending return signals without delay to the computer, and (2) holds off processing of the control signals, generated in response to the new command signals, until the termination of the file operation then in progress.

What is claimed is:

1. In a system having a plurality of signal lines, and means for applying command signals selectively to said signal lines for determining and controlling the mode of operation of a first equipment normally connected to said signal lines, the combination comprising: said signal lines; a simulator and control unit connected to said lines in place of said first equipment; a second equipment, different in kind from said first equipment, connected to said simulator and control unit, said second equipment requiring for control of its operation different, other command signals than those available on said selected lines; and logic circuit means in said unit responsive to the types and sequence of successive sets of command signals applied on said lines for generating therefrom the command signals required to determine and control the mode of operation of said second equipment.

2. In a system having a trunk with an input end and an output end, and means for applying first command signals at said input end to selected lines of said trunk for controlling directly the operation of a first equipment connected at said output end, the combination of: a simulator and control unit connected at said output end in place of said first equipment; a second equipment connected to said unit, said second equipment requiring for control of its operation second command signals differing from said first command signals and being incapable of having its operation controlled directly by said first command signals; logic circuit means in said unit responsive to said first command signals for generating logic signals; and means responsive to the type and sequence of said logic signals for generating said second command signals for controlling the operation of said second equipment.

3. The combination with a source for applying first control signals to selected lines of a trunk for controlling the operation of a first equipment normally connected to said trunk, said first equipment, when connected to said trunk, acknowledging said command signals by sending return signals to said source, of: a second equipment requiring, for control of its operations, second control signals different from said first control signals; a simulator and control unit connected between said trunk and said second equipment and including: logic circuit means responsive to said first control signals for sending said return signals to said source and for generating logic signals; and means responsive to the type and sequence of said logic signals for generating said second control signals.

4. The combination with a computer having a trunk for connecting a first equipment on-line to said computer, means for storing an instruction complement including operation codes for said first equipment, and means for decoding said operation codes and applying corresponding command signals on selected lines in said trunk which determine and control the mode of operation of said first equipment, said first equipment, when connected to said trunk, sending return signals to said computer acknowledging receipt of said command signals and identifying the operating mode of said first equipment, of: a simulator and control unit connected to said trunk; logic circuit means in said unit responsive to said command signals for sending said return signals to said computer and for generating control signals for local use in said unit; a second equipment, different in kind and mode of operation from said first equipment, connected to said simulator and control unit; and means responsive to combinations of said control signals for generating status levels for controlling the operation of said second equipment.

5. In combination: a computer having a set of signal lines and means for applying a limited number of first command signals on selected ones to said lines for determining and controlling directly the operation of a first peripheral equipment when the latter is connected to said lines; a second, different peripheral equipment which requires for control of its operation second, other command signals which differ from said first command signals; a simulator and control unit connected to said signal lines; logic means in said unit responsive to said first command signals for generating therefrom said second command signals; and means for applying said second command signals to said second peripheral equipment.

6. The combination as claimed in claim 5, wherein the number of second command signals required to control the operation of said second equipment exceeds the number of first command signals available, and wherein said logic means generates some of said second command signals by logically combining first command signals applied sequentially in point of time to said signal lines.

7. The combination with a computer having a trunk for connecting a first type of equipment on-line to said computer, means for storing an instruction complement including operation codes for said first equipment, and means for decoding said operation codes and applying, in response thereto, command signals on selected lines of said trunk, which command signals determine and control the mode of operation of said first equipment, of: a second, different type of equipment which has modes of operation which are different from those of said first equipment and those called for by said operation codes; a simulator and control unit connected between said trunk and said second equipment; and logic means in said control unit responsive to said command signals from said computer for generating therefrom the necessary command signals for determining and controlling the mode of operation of said second equipment.

References Cited by the Examiner

UNITED STATES PATENTS

| | | | |
|---|---|---|---|
| 2,906,996 | 9/1959 | Bachelet et al. | 340—147 |
| 2,968,791 | 1/1961 | Johnson et al. | 340—172.5 |
| 2,987,704 | 6/1961 | Gimpel et al. | 340—172.5 |
| 2,991,449 | 7/1961 | Lee | 340—147 |
| 3,131,377 | 4/1964 | Grondin | 340—172.5 |

OTHER REFERENCES

Rubinoff: Digital Computers for Real-Time Simulation, J. Assoc. Computing Machinery, July 1955. (Pages 186–204 relied on.)

ROBERT C. BAILEY, *Primary Examiner.*

STEPHEN W. CAPELLI, *Examiner.*

R. B. ZACHE, W. M. BECKER, K. E. JACOBS, *Assistant Examiners.*